J. A. FELLOWS.
TICKET OR CHECK NOTCHING DEVICE.
APPLICATION FILED JULY 30, 1920.
1,391,536.
Patented Sept. 20, 1921.
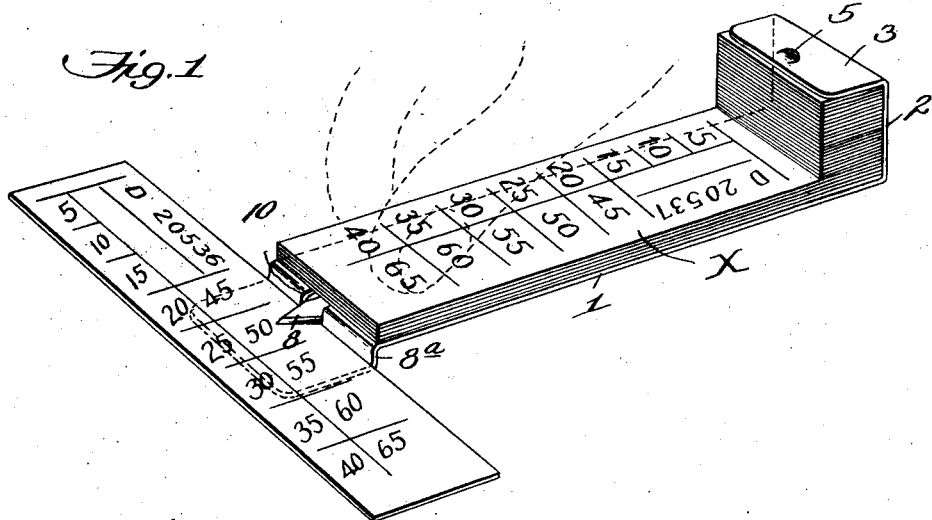
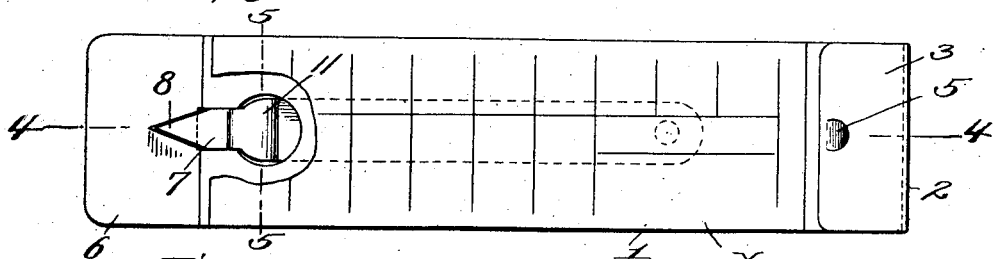
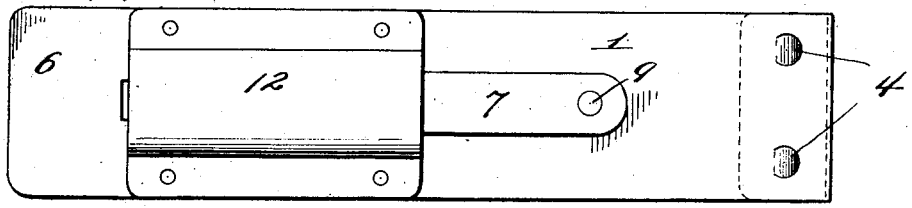
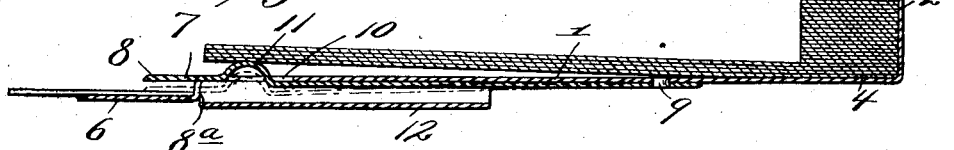
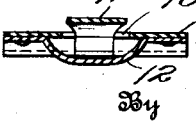
Inventor
James A. Fellows
Witness
By
Attorney

UNITED STATES PATENT OFFICE.

JAMES A. FELLOWS, OF PHILADELPHIA, PENNSYLVANIA, ASSIGNOR TO GLOBE TICKET COMPANY, OF PHILADELPHIA, PENNSYLVANIA, A CORPORATION OF PENNSYLVANIA.

TICKET OR CHECK NOTCHING DEVICE.

1,391,536.    Specification of Letters Patent.    Patented Sept. 20, 1921.

Application filed July 30, 1920. Serial No. 400,050.

*To all whom it may concern:*

Be it known that I, JAMES A. FELLOWS, a citizen of the United States, residing at Philadelphia, in the county of Philadelphia and State of Pennsylvania, have invented new and useful Improvements in Ticket or Check Notching Devices, of which the following is a specification.

My present invention relates to improvements in devices for notching or similarly marking tickets or restaurant or sales checks to indicate thereon the amount or value which the ticket or check represents, the invention being particularly applicable to devices for holding a pack of tickets or checks, such, for example, as those used in restaurants, cafés and the like, the notching device serving to indicate on each ticket or check the amount of the purchase, or the amount to be paid the cashier.

The primary object of the invention is to provide a novel and improved device of this character, whereby the operation of notching or marking the tickets or checks may be performed more quickly and with greater facility than is possible with devices of this kind as heretofore constructed, and a clearly defined notch is cut at the selected point on the ticket or check without liability of tearing or otherwise mutilating it.

To these and other ends, the invention consists in certain improvements and combinations and arrangements of parts, all as will be hereinafter more fully described, the features of novelty being pointed out particularly in the claims at the end of the specification.

In the accompanying drawings—

Figure 1 is a perspective view of a ticket or check notching device constructed in accordance with the preferred embodiment of the invention;

Fig. 2 represents a face view of the device shown in Fig. 1, a portion of the pack of checks being broken away to illustrate the notching device;

Fig. 3 is a view of the back of the device shown in Figs. 1 and 2;

Fig. 4 represents a section taken centrally through the device on the line 4—4 of Fig. 2; and Fig. 5 represents a transverse section through the device, taken on line 5—5 of Fig. 2.

Similar parts are designated by the same reference characters in the several views.

The present invention is applicable generally to devices adapted to be used for the purpose of notching or similarly marking an edge of a ticket or check, the notch to serve as an indication or designation with reference to printed matter borne by the ticket or check. The invention is applicable most advantageously to ticket holders or sales check holders, such as are commonly used in restaurants to indicate the amounts of the purchases or the amounts to be paid to the cashier by those to whom the tickets or checks are issued. The preferred embodiment of the invention is shown in the accompanying drawing and will be hereinafter described in detail, but it is to be understood that the invention is not restricted to the precise construction shown, as equivalent constructions are contemplated and these will be included within the scope of the claims.

The notching device, in the present instance is shown combined with a holder for a pack of tickets or checks. The device comprises a back plate 1 of suitable width, length and thickness to serve as a support for a pack of tickets or checks, designated X. This pack of tickets or checks is fixed or attached at one end, in any suitable way, to the back plate, the back plate being shown in the present instance as bent upwardly, as at 2, to form an abutment for the upper end of the pack, and is doubled over, as at 3, to provide a clip beneath which the upper end of the pack may be forced and thus held in fixed relation to the back plate. To assist in holding the pack in place, the back plate 1 may be provided with a suitable number of tongues or spurs 4 which may be punched forwardly therefrom and the doubled portion 3 may be formed with one or more similar tongues or spurs 5 punched rearwardly therefrom, these tongues or spurs operating to grip the stub or upper end of the pack and thus retain the pack in place. Preferably, the upper end of the pack of tickets or checks serves as a stub, from which the lower portions or bodies of the tickets may be detached, the tickets for this purpose being preferably scored, or weakened to facilitate detachment of the tickets from the stub.

The notching device, which, in the present instance, is combined with the ticket or check holder, comprises a support or platen 6 and a notch forming tongue 7. The support or platen 6 constitutes a rest upon which the ticket to be notched or marked is placed, while the point 8 of the notch forming tongue is adapted to be brought into engagement with the face of the ticket with suitable pressure, and while the ticket or check is so engaged, with the notching tongue located at the selected point of the ticket or check to be marked, the ticket or check is pulled or drawn forwardly or in a direction away from the support or platen 6 and over the point 8 of the notching forming tongue, this operation causing the portion of the ticket or check engaged by the point 8 to be cut from the edge of the ticket, thus providing the ticket with an indicating notch or mark. Preferably, the support or platen 6 is offset rearwardly relatively to the part of the back plate 1 against which the pack of tickets or checks rests, thus forming a shoulder or abutment 8ª which extends perpendicularly, or substantially so, to the plane of the support or platen 6, this shoulder or abutment thus providing a gage against which the edge of the ticket to be notched may rest, thus determining the depth of the notch which will be formed in the ticket. The notch forming tongue 7, which is preferably formed of flat spring steel, or other suitable resilient material, is applied to the rear face of the back plate 1, it being preferably riveted, as at 9, to said back plate, toward one end of the tongue, and the tongue has a normal tendency to bear against the rear face of the back plate. The free end of the tongue which bears the notch forming point 8, extends through a slot or opening 10 which is formed in the offset portion 8ª, the point normally occupying a position above and opposite to the support or platen 6 to enable the edge of a ticket or check to be readily inserted between the point and the platen, this slot 10, however, permitting the tongue to be operated to bring the point 8 thereof into engagement with the face of the ticket or check on the support or platen 6. The tongue 7 is preferably operated to bring the notch forming point 8 thereof into engagement with the ticket by pressure of the thumb or finger of the operator upon the lower portion of the pack of tickets or checks, for which purpose the tongue 7 is formed with a bend or projection 11, which protrudes through the slot 10 and beyond the forward face of the back plate 1, this bend or projection of the tongue 7 coming into contact with the rear of the pack of tickets or checks, near the lower or unattached end of the pack and thus forcing this part of the pack of tickets or checks forwardly away from the back plate. When a ticket or check to be notched is placed on the support or platen 6, pressure exerted on the pack of tickets or checks at or near the lower or unattached end of the pack will force this portion of the pack of tickets rearwardly or toward the back plate 1, thereby forcing the tongue rearwardly to bring the point 8 thereof into contact with the face of the ticket on the support or platen 6, by reason of the engagement of the bend or projection 11 of the tongue with the rear face of the pack of tickets. In order to enable this operation to be performed by hand, without interfering with the rearward movement of the tongue 7, a shield or guard 12 is preferably secured to the rear face of the back plate, this shield or guard being arched or bowed so as to bridge the tongue and thus enabling the tongue to move rearwardly under the pressure imposed upon it by the pack of tickets or checks, without being interfered with by the pressure which may be imposed by the hand or fingers against the rear side of the ticket or check holder.

A ticket or check notching device constructed in accordance with the present invention enables the tickets or checks to be placed quickly and easily with the appropriate portion thereof to be notched, in register with the notching point 8, the ticket being placed on the forward side of the holder with its face side forward, so that it may be read easily during this operation, and pressure upon the lower or unattached end of the pack of tickets or checks, followed immediately by pulling forward the edge of the ticket opposite to the edge engaged by the notch forming point, serves to notch the ticket at the selected point. The operation of notching the tickets may, therefore, be performed with great facility, especially where, as in the present instance, the ticket or check holder is adapted to be attached at its upper end to a belt or other support carried by the individual who issues the tickets or checks.

I claim as my invention:

1. In a device of the character described, a plate having an offset therein forming a support for a check and an abutment for the edge of a check on said support, and a tongue attached to said plate and extending through said offset and provided with a notch-forming point arranged opposite to said support.

2. In a device of the character described, a plate having means for holding a pack of checks at its forward side, said plate being offset rearwardly toward one end to form a support for a check and a shoulder to act as a gage for such check, and a tongue attached to the rear side of said plate and extending through said offset and having a notch-forming point arranged in front of and opposite to the said support.

3. In a device of the character described, a plate provided with a flat portion for holding a pack of checks at its forward side, said plate having a portion toward one end thereof offset rearwardly to provide a support for a check and a shoulder at the junction of said offset portion and said flat pack-holding portion to coöperate as a guide with an edge of a check placed on the forward side of said support, and a notch-forming tongue overlying the forward face of said support.

4. In a device of the character described, a member provided with means for holding a pack of checks at its forward side and having a rearward offset therein forming a support to receive a check to be notched and an adjacent shoulder to coöperate as a gage with an edge of a check on said support, and a tongue attached at one end to the rear side of said member and having a notch-forming point arranged opposite to the front side of said support and movable toward the latter to engage a check thereon, said tongue also having a part bearing against the rear side of the pack to normally force the same forwardly relatively to said member, the tongue being movable rearwardly by movement of the pack rearwardly relatively to said member.

5. In a device of the character described, in combination, a member provided with means for holding a pack of checks at its forward side, said member having a support to receive a check to be marked, a marking device embodying a tongue mounted at the rear side of said member and movable toward and from said member, said marking device having a part which engages and normally pushes a portion of the pack forwardly relatively to said member, said marking device being movable into marking relation with a check on said support by movement of said portion of the pack rearwardly toward said member, and a guard on the rear side of said member, and bridging the tongue of the marking device.

In testimony whereof I have hereunto set my hand in presence of two subscribing witnesses.

JAMES A. FELLOWS.

Witnesses:
Wm. D. Snow,
C. W. Zuber, Jr.